(12) United States Patent
Safranek et al.

(10) Patent No.: US 7,296,127 B2
(45) Date of Patent: Nov. 13, 2007

(54) NODMA CACHE

(75) Inventors: Robert J. Safranek, Portland, OR (US); Debendra Das Sharma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 10/404,881

(22) Filed: Mar. 31, 2003

(65) Prior Publication Data

US 2004/0193755 A1    Sep. 30, 2004

(51) Int. Cl.
*G06F 12/14* (2006.01)

(52) U.S. Cl. ...................... 711/163; 711/152

(58) Field of Classification Search ............... 711/108, 711/152, 163, 164
See application file for complete search history.

(56) References Cited

U.S. PATENT DOCUMENTS

| | | | | |
|---|---|---|---|---|
| 5,079,737 A | * | 1/1992 | Hackbarth | 711/164 |
| 5,134,700 A | * | 7/1992 | Eyer et al. | 711/164 |
| 5,432,950 A | * | 7/1995 | Sibigtroth | 711/163 |
| 5,646,890 A | * | 7/1997 | Lee et al. | 365/185.11 |
| 5,930,826 A | * | 7/1999 | Lee et al. | 711/163 |
| 6,473,861 B1 | * | 10/2002 | Stokes | 713/193 |
| 6,490,657 B1 | | 12/2002 | Masubuchi et al. | |
| 6,785,790 B1 | * | 8/2004 | Christie et al. | 711/163 |
| 2002/0152352 A1 | | 10/2002 | Ikegai et al. | |
| 2002/0156962 A1 | | 10/2002 | Chopra et al. | |

FOREIGN PATENT DOCUMENTS

CN      1176433 A      3/1998

OTHER PUBLICATIONS

PCT International Preliminary Report on Patentability, dated Oct. 1, 2005 (International Application No. PCT/US2004/003387 - -International Filing Date Feb 6, 2004) P15885PCT (9 pages).

* cited by examiner

*Primary Examiner*—T Nguyen
(74) *Attorney, Agent, or Firm*—Blakely, Sokoloff, Taylor & Zafman LLP

(57) ABSTRACT

A NoDMA cache including a super page field. The super page field indicates when a set of pages contain protected information. The NoDMA cache is used by a computer system to deny I/O device access to protected information in system memory.

12 Claims, 4 Drawing Sheets

NODMA CACHE

BACKGROUND

1. Field of the Invention

The invention relates to security devices for protecting sensitive data from inappropriate access by I/O devices. More specifically, the invention relates to a cache for a NoDMA table that tracks the segments of memory that contain sensitive data.

2. Background

Financial and personal transactions are being performed on computing devices at an increasing rate. However, the continual growth in the number of such financial transactions has also led to increased attacks on the computer systems supporting these transactions and a corresponding need for security enhanced (SE) environments to prevent unauthorized access to or loss of sensitive data. Loss or unauthorized access of sensitive data (e.g., social security numbers, account numbers, financial data, account balances, passwords, authorization keys, etc.) results in a loss of privacy, theft of private financial data and similar malicious actions.

One technique used to attempt to access protected data is the use of memory access requests from peripheral devices through the direct memory access (DMA) controller. A DMA controller allows peripheral devices such as network cards to read and write to system memory with minimal usage of the central processing unit. The use of memory access requests from I/O devices can circumvent the security measures provided by an operating system. This may be achieved by making requests for memory access to segments of memory containing sensitive information that is outside the segment of system memory designated for use by the peripheral device.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
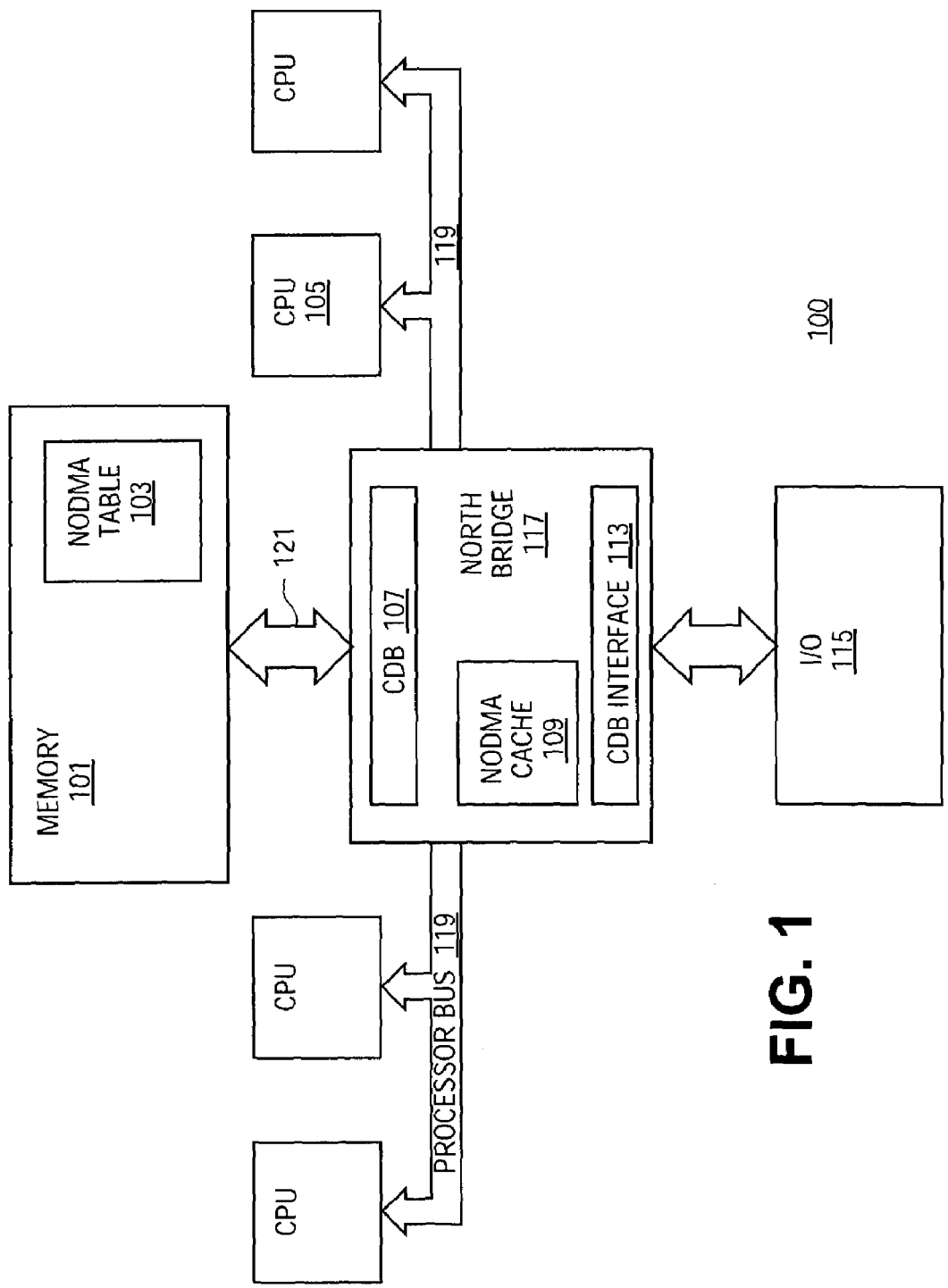
FIG. 1 is a block diagram of a computer system including a NoDMA cache.

FIG. 1 illustrates one embodiment of a computer system 100 including a chipset ("north bridge") 117, a set of central processing units (CPUs) 105 and system memory 101. In one embodiment, the set of CPUs 105 is connected to the northbridge 117 via processor bus 119. In one embodiment, computer system 100 contains multiple processors 105 to support multiprocessing in a server environment. In another embodiment, computer system 100 may include a single CPU. The system memory 101 is connected to the northbridge 117 via memory bus 121. System memory 101 includes a no direct memory access (NoDMA) table 103.

In one embodiment, system memory 101 is a set of random access memory devices such as a synchronous dynamic random access memory (SDRAM), double data rate random access memory (DDR RAM), or similar devices. The memory system 101 may also include registers and similar storage devices. A NoDMA table 103 is stored in system memory 101, which tracks the segments of the system memory 101 that contain sensitive data. Sensitive data may include social security numbers, financial account numbers, passwords, and similar data.

The NoDMA table 103 data can be used by an operating system (OS) to restrict access to memory segments containing sensitive data by flagging an entry in the NoDMA table 103 corresponding to the segment of memory containing the sensitive data and allowing only those programs that are authorized to access secret information to access the protected sections of memory 101. In one embodiment, system memory 101 is segmented into pages. Pages can vary in size as determined by the operating system. In one embodiment, the pages are four kilobytes in size.

In one embodiment, the NoDMA table 103 is structured as a contiguous set of bits each corresponding to a page of memory 101. If a page contains sensitive data the operating system will 'set' the bit corresponding to that page in the NoDMA table 103. The base or start of the NoDMA table 103 is relocatable in system memory 101. In one embodiment, an operating system, basic input output system (BIOS) or similar system can relocate the NoDMA table 103, for example after boot of system 100. NoDMA table 103 is located in system memory 101 based on the start address stored in the base register. NoDMA table 103 is sized according to data stored in a size register. When NoDMA table 103 is enabled, all accesses by an I/O device must be checked against the table 103.

In one embodiment, the NoDMA table 103 is aligned to start at a page boundary and end at a page boundary. This alignment simplifies the use of the NoDMA table 103. In another embodiment, the NoDMA table 103 may start at any address in memory 101 that allows sufficient contiguous space for the table 103. Each bit from the starting point to the end point of the NoDMA table 103 indicates the access privilege for non-CPU accesses of each page of memory 101 starting with address 0 to cover the entire memory address space that needs to be protected. When the northbridge 117 needs to check access rights privileges for a particular address, it can determine easily the access privileges for the page because the northbridge 117 has access to the starting address of the NoDMA table 103 and the page address of the page to be accessed. Thus, the corresponding NoDMA table 103 entry can be easily calculated and accessed.

In one embodiment, northbridge 117 handles communication between system memory 101, CPUs 105 and I/O devices 115. The northbridge 117 includes a central data buffer (CDB) which processes incoming memory access requests from CPUs 105, I/O devices and sources 115. Central control block (CDB interface) 113 handles initial processing of incoming memory access requests and final processing of outgoing requests. Memory access requests waiting to be processed by CDB 107 or CDB interface 113 are stored in queues. CDB 107 and CDB interface 113 process memory requests from I/O devices 115 and send requested data from system memory 101 to I/O devices 115.

The northbridge 117 includes a set of queues that store incoming and outgoing memory access requests (e.g., read and write requests). In one embodiment, the queues are first in first out queues (FIFOs) or employ a similar queue management scheme. The northbridge 117 also includes a NoDMA cache 109, which stores recently requested NoDMA table entries. This cache 109 is maintained and used by the CDB interface 113 before accessing memory 101. CDB interface 113 also manages incoming and outgoing messages in their respective queues. In one embodiment, the northbridge 117 also includes a set of registers related to the function of NoDMA table 103 and NoDMA cache 109. These registers include status registers, a base address register that indicates the address in memory 101 where NoDMA table 103 starts, and a size register that indicates the size of NoDMA table 103 in system memory 101.

In one embodiment, northbridge 117 protects memory 101 from access by non-CPU devices. Segments of memory that contain protected data cannot be read or written to by a non-CPU device. Protected pages are not static and pages can be moved into and out of protected status. In one embodiment, northbridge 117 uses NoDMA table 103 and NoDMA cache 109 to enforce this system. NoDMA cache 109 aids in the I/O performance. In one embodiment, I/O access to a NoDMA table 103 region of memory 101 is always denied even when NoDMA table 103 is disabled. Any attempts to access this region of system memory 101 cause an error, are logged by the northbridge 117 chipset and the system is reset.

The I/O source 115 may be a communication control device ("southbridge") which handles communication between peripheral devices (e.g., storage drives, modems, network cards and similar devices) and other peripheral devices or the northbridge 117. The southbridge 115 or northbridge 117 may have multiple I/O units that can be configured to various widths of ports. The I/O units can support communication protocols including PCI-Express, Hublink (HL), Peripheral Component Interconnect (PCI) and similar systems. A separate NoDMA cache 109 may be dedicated to each I/O unit or a subset of the total units in order to improve the performance of the NoDMA verification. In another embodiment, an I/O source 115 may be a set of peripheral devices directly connected to northbridge 117.

Figure 2:
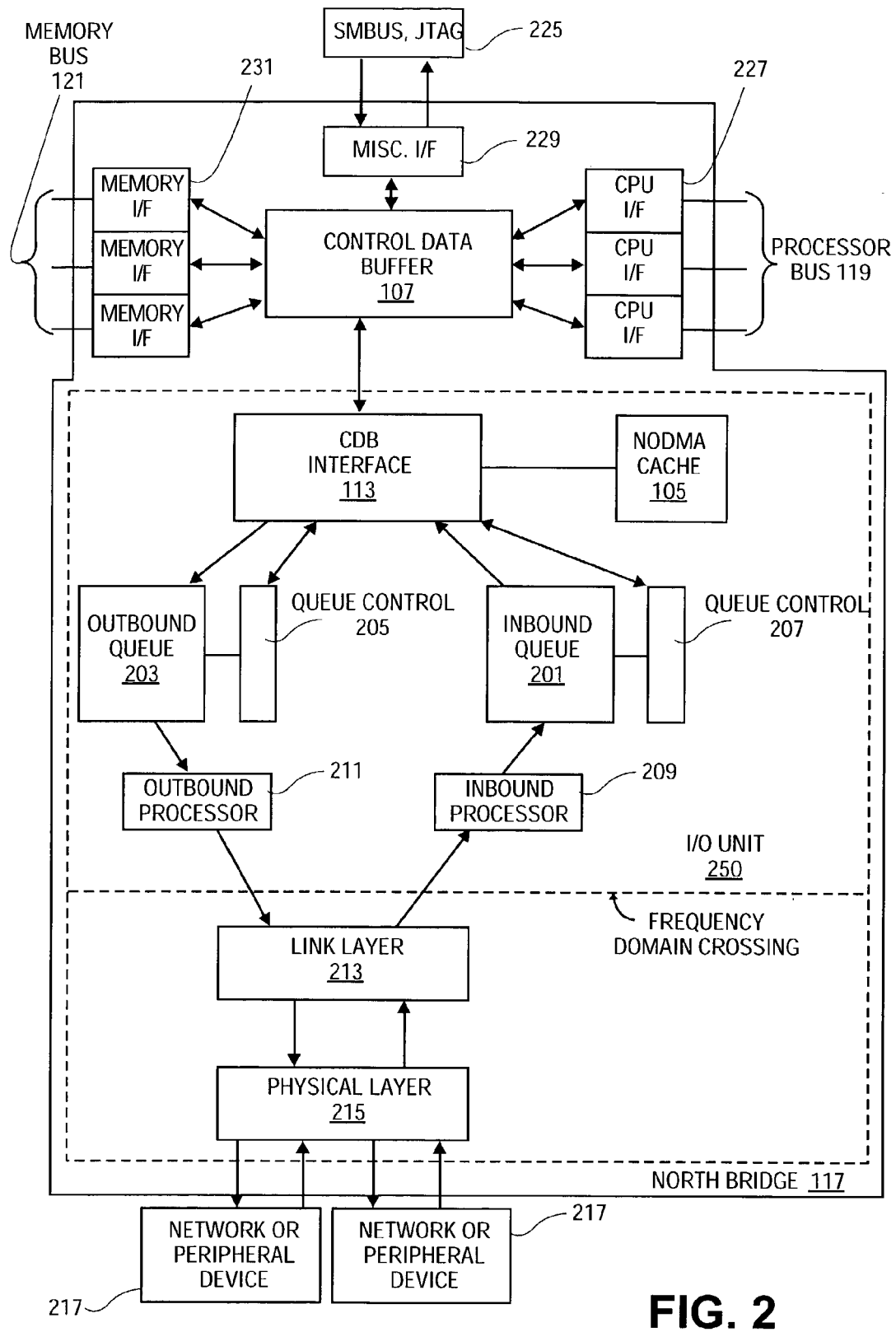
FIG. 2 is a block diagram of input and output dataflow through a chipset implementing NoDMA.

FIG. 2 is a block diagram of northbridge 117. This diagram illustrates the structures that support a memory access request from a peripheral device 217 to system memory 101 and the return of requested or outgoing data. Network or peripheral devices 217 communicate over a physical layer 215 and link layer 213 with inbound processor or logic 209 and outbound processor or logic 211 of I/O unit 250. Inbound processor 209 receives memory access requests and messages from the link layer 213 and places these messages in the inbound queue 201. In one embodiment, inbound queue 201 and outbound queue 203 are each composed of a number of queues that each handle a specific type of message or request or a defined set of requests or message types. Inbound queue control 207 manages the movement of data through queue 201 which is read by CDB interface 113. CDB interface 113 processes memory access requests and may generate response messages (e.g., when processing read operations) that are sent to the outbound queue 203. Dataflow through outbound queue 203 is controlled by outbound queue controller 205.

In one embodiment, there are multiple outbound and inbound queues 201 and 203, that correspond to the message, or memory access types used by PCI-Express, HL, PCI or other similar systems. Outbound processor 211 sends the response data over the link layer 213 and physical layer 215 to peripheral device 217. In one embodiment, outbound logic 211 and inbound processor 209 handle the transmission of data coming from an I/O communication bus running at a different speed than northbridge 117.

In one embodiment, CDB interface 113 and CDB 107 perform predictive prefetches of requested memory by looking ahead in the inbound queues 201. The CDB interface 113 is responsible for making requests to the CDB and servicing the requests. CDB interface 113 enforces access rights to the system memory 101, tracks outstanding requests to CDB 107, services outstanding DMA read requests, performs DMA writes, tracks inbound completions, interrupts and similar functions.

The CDB interface 113 performs the access rights checks for the memory accesses from I/O devices to ensure security in the system. If an I/O device tries to access a region in memory for which it does not have access rights, then the CDB interface 113 denies access to that request. For memory reads as well as any access that needs completion, it sends a master-abort response indicating to the requester that the access was invalid. For memory writes and other transactions that do not need a response, the write is dropped by the control logic of the CDB interface 113. In either case, the security violation is logged by northbridge 117.

CDB 107 interacts with the CDB interface 113, memory bus interface 231, CPU bus interface 227 and other interfaces 229 to route and forward data between the Input-Output unit 250, processor bus 119, and memory bus 121. In one embodiment, CDB 107 also handles input and output to a System Management Bus (SMbus), Joint Test Action Group (JTAG) 225 or similar interface.

In one embodiment, the northbridge 117 checks the NoDMA cache 109 and NoDMA table 103 when receiving SMBus, JTAG, and similar interface accesses. These interfaces allow system administrators or service personnel to monitor and diagnose a system. Memory accesses from SMBus, JTAG or similar interfaces are processed similar to memory accesses of peripheral devices. The memory accesses from SMBus, JTAG or similar interfaces are checked against the NoDMA table 103 and NoDMA cache 109. This prevents even system administrators or service personnel from bypassing page protection mechanisms of an OS and accessing pages with secret information. In another embodiment, northbridge 117 can be configured such that SMBus, JTAG and similar interface accesses are not checked against the NoDMA table, or a security level setting can be adjusted to enable or disable the NoDMA check for these interfaces.

Figure 3:
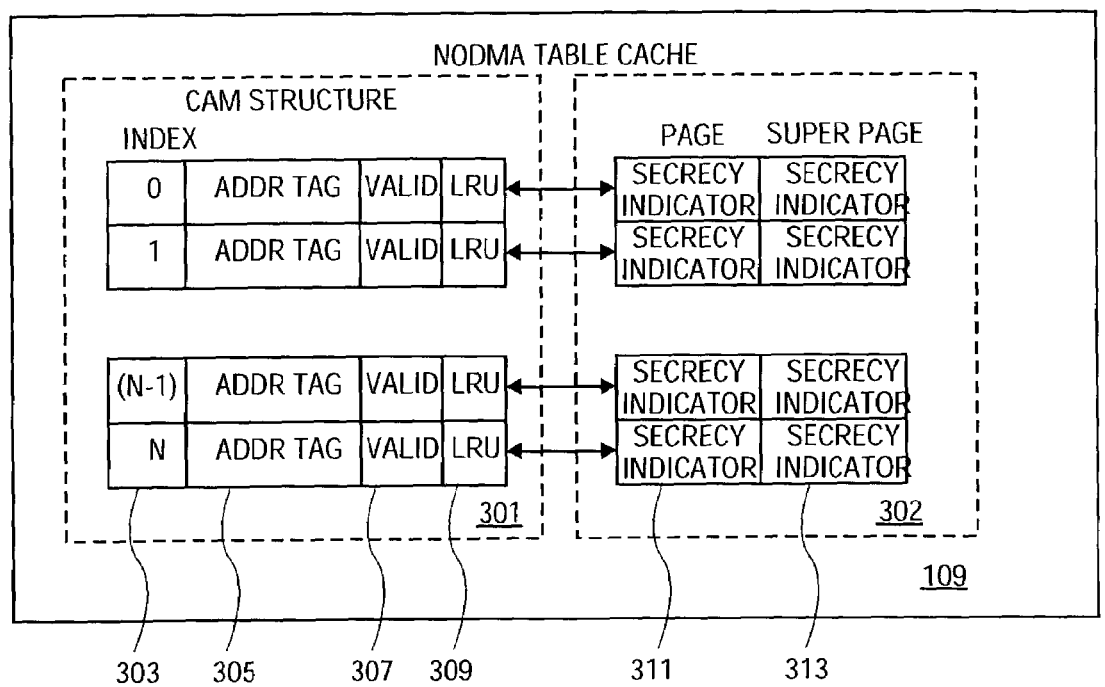
FIG. 3 is a diagram of a NoDMA cache structure.

FIG. 3 is a diagram of the structure of a NoDMA table cache 109. In one embodiment, cache 109 reduces bandwidth loss caused by accessing NoDMA table 103 in system memory 101. The NoDMA table 103 and cache 109 eliminate the need for a blockmap of memory to track pages with secrets. In one embodiment, memory accesses in computer system 100 are optimized for system cache line sizes. The system cache being the general cache for memory accesses to system memory. In one embodiment, the cache line size is 512 bits.

In one embodiment, NoDMA cache, 109 includes a content addressable memory (CAM) structure 301 and secrecy storage information structure 302. CAM structure 301 stores information in 'rows.' Each row corresponds to an entry (e.g., a page secrecy indicator) in the NoDMA table 103 stored in system memory 101. In one embodiment, CAM structure 301 stores or inherently includes an index 303. The index is used by in connection with the cache replacement scheme to identify and replace lines of cache. In one embodiment, the CAM structure 301 does not store the index 303 explicitly since the logic circuitry in the hardware knows which entry corresponds to an index.

CAM structure 301 is addressed by addresses stored in the address tag storage fields 305. 'Valid' storage bit field 307 indicates whether or not the entry for the row is valid. If the page corresponding to the cache row is written to or altered then the valid bit would be cleared because the contents of the page are no longer known and consequently it is not known if protected information is stored in the page.

In one embodiment, CAM structure 301 also stores cache management information such as a least recently used bit 309 (LRU). This field 309 of CAM 301 is used to track the relative age of the entry so that older or infrequently used entries can be replaced with recent or more frequently used entries. Any cache management and replacement scheme may be used for the NODMA cache 109. The secrecy information storage device 302 stores two separate secrecy indicators for each entry in NoDMA table 103. Page secrecy field 311 indicates whether a page of memory 101 contains protected information. The page secrecy indicator may be a bit or set of bits that encode the state of the page (e.g., containing protected information) that corresponds to the NoDMA table address in the same row of cache 109.

A superpage secrecy field 313 indicates whether a set of pages, to which the page addressed by the entry belongs, include protected information. In one embodiment, a superpage is a set of contiguous pages. The size of a superpage can be set by an operating system, BIOS or similar software. In one embodiment, there are 512 pages in each superpage. In one embodiment, the bits of a NoDMA table 103 are grouped into superpages corresponding to the size of a system cache line and memory access sizes. Superpage secrecy indicator 313 may be a single bit or a group of bits. In one embodiment, the superpage is calculated when a new entry is made into NoDMA cache 109. All of the bits corresponding to the superpage are retrieved along with the specific page bit corresponding to the new entry into the cache 109. These bits are logically 'OR'ed to determine the value of a single superpage bit. In one embodiment, the superpage is represented by multiple bits. The superpage is then calculated by using a logical 'OR' to determine each of the subsections of the superpage corresponding to each bit. For example 512 consecutive pages may be represented by four superpage bits in the NoDMA cache 109, each one corresponding to a set of 128 pages. Superpage sizes can be adjusted to correspond to the size of the accesses. A single superpage or multiple superpages can correspond to the size of the cache line access. In one embodiment, the size of the set of pages is equal to the natural access size of the memory controller.

In one embodiment, the address tag 305 of the CAM is comprised of two parts: a super page and a page offset within the superpage. When I/O unit 250 receives an access, the incoming address is passed through the CAM structure. Each row compares this incoming address to the address tag 305 if the valid bit is set. There are three possible outcomes for each row. First, both the superpage and page offsets match (and valid is set), second, only the superpage offset matches the incoming address (and valid is set), and, third, there is no match or the valid bit is not set. At most one row will have the first outcome. In that case, the corresponding page secrecy indicator 311 is used to decide the access rights for the incoming address for the memory access request. If the incoming address cannot be matched with the superpage and page offsets of the address tag 305, then a cache row with a superpage offset match is used. If the superpage secrecy indicator 313 indicates there are no secrets in any of the pages that belong to the superpage, then access rights are granted. No further look up of the NoDMA table 103 is needed. However, if the superpage secrecy indicator 313 indicates that at least one page in the superpage has secrets, then northbridge 117 accesses the NoDMA table 103 to determine if the requested memory access page contains secrets. It is possible that multiple entries in cache 109 will have matching superpage address tags 305. In that situation, any of the superpage matching rows can be used. If no rows in cache 109 have a matching superpage address, then the NoDMA table 103 needs to be accessed.

In one embodiment, the use of a NoDMA table 103 allows the computer system 100 to scale for large system memory 101 (e.g., greater than 4 gigabytes (GB)) and for dynamic resizing of memory (e.g., if memory is hot plugged into a system). Support for dynamic resizing of memory and the use of superpages, as well as, pages allows for varying levels of granularity in verifying memory accesses without requiring a system reset. A superpage may be composed of multiple bits to control the level of granularity of the size of the segment that a superpage represents. Additional bits allow superpages to represent smaller segments of memory and serve as more accurate indications of where protected information is located. Superpages represented by fewer bits decrease the complexity of the NoDMA caching system in particular the generation of the superpage indicator. The implementation of a logical 'OR' is simplified when fewer bits are used. This variation in the level of granularity by varying the bits representing a superpage allows for greater customization of design toward speed or reduced space requirements dependent on the needs of a system.

In one embodiment, NoDMA cache 109 and northbridge 117 process a set of instructions related to the function of NoDMA cache 109. The cache 109 can be enabled or disabled by separate instructions. An enable instruction enables the use of the NoDMA cache, clears all valid bits for stored entries in cache 109 and sets status bits in northbridge 117 and cache registers that indicate the enablement of No DMA cache 109. A disable instruction disables NoDMA cache 109 and clears status bits in registers of the northbridge 117 and cache 109 that indicate the enablement of cache 109. NoDMA cache 109 may be disabled while NoDMA table 103 is enabled. An invalidate instruction clears valid bits for all entries in the cache.

In one embodiment, a bit or stored value, e.g., a superpage bit, page bit, LRU bit or similar stored value is 'set' by storing a logical '1' or set of logical '1's in the appropriate field. A bit or stored value may be logically 'set' by storing any value including a logical '0'. The designated value is defined in connection with a 'set' operation. Likewise, a 'clear' operation for a bit or stored value may use any designated value other than the 'set' indicator value.

In one embodiment, the NoDMA cache 109 is maintained by software, such as the operating system. When write operations are allowed, the operating system is responsible for properly invalidating references to written areas in the NoDMA cache 109. In one embodiment, an OS updates the NoDMA table 103 to identify secret pages. The OS also determines if there are other memory accesses in progress when the NoDMA table 103 or NoDMA cache 109 is being checked.

Figure 4:
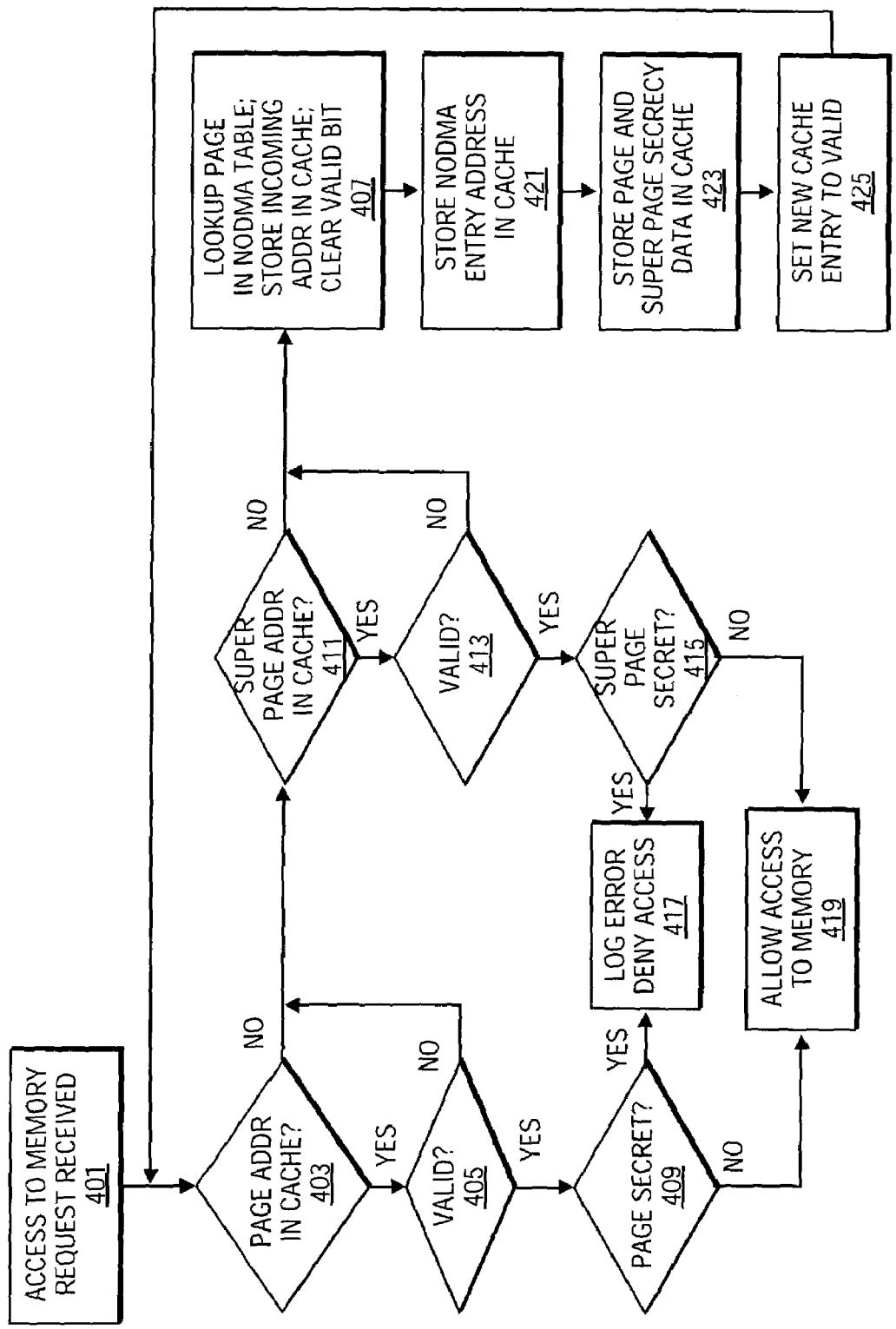
FIG. 4 is a flow chart of a NoDMA cache system.

FIG. 4 is a flow chart of the operation of NoDMA cache 109. In one embodiment, memory access requests are processed by CDB 107 and CDB interface 113 (block 401). CDB interface 113 checks NoDMA cache 109 to determine if an address requested for access is stored in cache 109. The requested address is compared to the address tags 305 stored in cache 109 by use of CAM structure 301 (block 403). If a tag 305 matching the requested page address is found in the cache 109, then the corresponding valid bit is checked to determine if the cache entry is still valid (block 405). If the valid bit is set, then the page secrecy indicator 311 is checked (block 409). If the secrecy indicator is set then access is denied and an error may be logged (block 417). If the secrecy indicator is not set then access is allowed (block 419).

In one embodiment, when an entry in cache 109 for a requested page is not found, then the cache 109 is checked to determine if protected information is stored in the superpage. First, the address tags 305 are checked to find a corresponding super page entry (block 411). If an entry is found, its validity is checked (block 413). If superpage entry is found and no protected data is stored in the superpage (block 415) then the memory access request is allowed to proceed (block 419). If the superpage secrecy indicator 313 is set then access is denied and an error may be logged (block 417).

In one embodiment, if either the requested superpage address is not found in cache 109 or the entry is not valid then the page secrecy information is retrieved from NoDMA table 103, which is stored in system memory 101 (block 407). The address tag is stored in an available cache row and the valid bit for that row is cleared. The data accessed from NoDMA table 103 is then stored in NoDMA cache 109 (block 421).

The entry that is created in cache 109 includes the page secrecy indicator 311 and superpage secrecy indicator 313. The superpage secrecy indicator 313 is calculated and stored based on a logical 'OR' of the pages in the superpage (block 423). In one embodiment, the specific page secrecy information will be retrieved and stored as an entry. In another embodiment, the entry will correspond to the first page in the superpage. In another embodiment, the entry may correspond to any page in the superpage. When the entry is created the valid bit for the entry is set (block 425).

When there is protected information in a page the memory access is not allowed (block 417). Depending on the type of the memory access (e.g., read or write) an error response message may be returned (e.g., if a read operation were denied, the normal response message would be replaced with an error response message). The error and denied access are logged to be subsequently analyzed to determine the cause of the error or determine if a malicious request or attack was made. In one embodiment, the types of requests that generate error or security logging can be defined (e.g., set by the operating system). In one embodiment, northbridge 117 responds to an access violation from the NoDMA cache 109 by logging a fatal error and resetting. Errors include accessing a page with secrets, or accessing NoDMA table 103 while that is not allowed. Errors are logged in error registers. The error registers may map the appropriate signaling method for a given error detected. The error registers are not accessible by an I/O device that maybe requesting memory access.

In one embodiment, the NoDMA cache 109 is implemented in software (e.g., microcode or higher level computer languages). The software implementation may also be used to run simulations or emulations of the NoDMA cache 109. A software implementation may be stored on a machine readable medium. A "machine readable" medium may include any medium that can store or transfer information. Examples of a machine readable medium include a ROM, a floppy diskette, a CD-ROM, an optical disk, a hard disk, a radio frequency (RF) link, or similar media.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a request from a client to access memory content:
   dividing memory into segments, each segment of the memory segments representing a page having the memory content;
   associating a memory access table to the memory segments, the memory access table having a contiguous set of bits;
   tracking the memory segments to determine whether the memory content includes protected content;
   determining whether the client be allowed access to the memory content by checking whether the memory content includes protected content and whether the client is authorized to access the protected content;
   allowing the client access to the memory content when the memory content does not include the protected content or when the memory content includes the protected content and the client is authorized to access the protected content; and
   denying the client access to the memory content when the memory content includes the protected content and the client is not authorized to access the protected content.

2. The method of claim 1, wherein the determining of whether the client be allowed access to the memory content includes checking memory indicator associated with the memory access table.

3. The method of claim 2, further comprising:
   allowing the client access to the memory content if the memory indicator is not set, and denying the client access to the memory content if the memory indicator is set.

4. The method of claim 3, further comprising generating a violation indicator if the second secrecy indicator is set, the violation indicator includes an error.

5. The method of claim 4, wherein the error indicates an unsuccessful attempt by the client to access the memory content.

6. A system comprising:
   a storage medium coupled to a server having a cache and a processor and input/output (110) devices, the storage medium having a memory access table, and instructions to facilitate the processor to perform tasks; and
   the processor to receive a request from a client to access memory content, the client coupled to the server, divide memory into segments, each segment of the memory segments representing a page having the memory contents,
   associate a memory access table to the memory segments, the memory access table having a contiguous set of bits,
   track the memory segments to determine whether the memory content includes protected content,
   determine whether the client be allowed access to the memory content by checking whether the memory content includes protected content and whether the client is authorized to access the protected content,
   allow the client access to the memory content when the memory content does not include the protected content or when the memory content includes the protected content and the client is authorized to access the protected content, and deny the client access to the memory content when the memory content includes the protected content and the client is not authorized to access the protected content.

7. The system of claim 6, wherein the cache includes a cache a no direct memory access (NODMA) cache.

8. The system of claim 6, wherein the memory access table comprises a NODMA table, the NODMA table in communication with the NODMA cache.

9. The system of claim 6, wherein the processor is further to analyze a logged error via an error analyzer, wherein the logged error indicates an unsuccessful attempt by the client to access the memory content.

10. A computer-readable medium having instructions which, when executed, cause a machine to:
   receive a request from a client to access memory content;
   divide memory into segments, each segment of the memory segments representing a page having the memory content;
   associate a memory access table to the memory segments, the memory access table having a contiguous set of bits;
   track the memory segments to determine whether the memory content includes protected content;
   determine whether the client be allowed access to the memory content by checking whether the memory content includes protected content and whether the client is authorized to access the protected content;
   allow the client access to the memory content when the memory content does not include the protected content or when the memory content includes the protected content and the client is authorized to access the protected content; and
   deny the client access to the memory content when the memory content includes the protected content and the client is not authorized to access the protected content.

11. The computer-readable medium of claim 10, wherein the instructions when further executed, cause the machine to analyze a logged error via an error analyzer, wherein the logged error indicates an unsuccessful attempt by the client to access the memory content.

12. The computer-readable medium of claim 10, wherein the instructions when executed to determine whether the client be allowed access to the memory content includes checking memory indicator associated with the memory access table.

* * * * *